US012582852B2

(12) United States Patent
Weiss et al.

(10) Patent No.: US 12,582,852 B2
(45) Date of Patent: Mar. 24, 2026

(54) STRAP ADJUSTER WITH TORQUE-LIMITING FUNCTIONALITY

(71) Applicant: 3M INNOVATIVE PROPERTIES COMPANY, St. Paul, MN (US)

(72) Inventors: Michael T. Weiss, Hastings, MN (US); Nathan C. Meyer, Lake City, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 419 days.

(21) Appl. No.: 18/308,182

(22) Filed: Apr. 27, 2023

(65) Prior Publication Data

US 2023/0364453 A1 Nov. 16, 2023

Related U.S. Application Data

(60) Provisional application No. 63/341,124, filed on May 12, 2022.

(51) Int. Cl.
*A62B 35/00* (2006.01)

(52) U.S. Cl.
CPC ...... *A62B 35/0025* (2013.01); *A62B 35/0018* (2013.01)

(58) Field of Classification Search
CPC ........................ A62B 35/0025; A62B 35/0018
USPC ............................................... 182/3; 403/362
See application file for complete search history.

(56) References Cited

U.S. PATENT DOCUMENTS 1,937,447 A * 11/1933 Tokheim ................. G01F 23/40 73/321
2,552,276 A * 5/1951 Harvey ................ G03B 17/305 242/596.4
3,476,349 A * 11/1969 Smith .................... G02B 7/004 403/375
6,241,174 B1 * 6/2001 Nelsen .................. B60P 7/0846 242/388.3
6,350,088 B1 * 2/2002 Priester ................... B60P 7/083 410/104
7,217,057 B2 * 5/2007 Keller ................ A61B 17/8645 606/62
8,794,378 B2 * 8/2014 Wolner .............. A62B 35/0031 242/378.1
8,959,664 B2 2/2015 Johnson et al.
(Continued)

FOREIGN PATENT DOCUMENTS

WO 2010117651 A1 10/2010
WO 2020074867 A2 4/2020
(Continued)

OTHER PUBLICATIONS

"Exofit™ Series X300 Full Body Harness", 3M Saala Fall Protection Full Line Catalogue, User Instructions, 2021, pp. 01-24.

*Primary Examiner* — Muhammad Ijaz
(74) *Attorney, Agent, or Firm* — Kenneth B. Wood

(57) ABSTRACT

A strap adjuster including an adjustment knob and a biased pin, the adjustment knob having a first interior annular collar that is configured to accept the head of the biased pin thereinto, the first interior annular collar comprising a first circumferentially-oriented notch defined on one circumferential end by a circumferential wall and defined on a second, opposing circumferential end by a circumferential ramp.

20 Claims, 9 Drawing Sheets

(56) References Cited

U.S. PATENT DOCUMENTS

| | | | | |
|---|---|---|---|---|
| 8,967,332 | B2 * | 3/2015 | Wolner | A62B 35/0031 254/222 |
| 9,174,073 | B2 | 11/2015 | Casebolt et al. | |
| 10,137,322 | B2 | 11/2018 | Perner | |
| 12,186,599 | B2 * | 1/2025 | Perner | F16G 11/12 |
| 2007/0134061 | A1 * | 6/2007 | Nance | E05B 47/0045 403/DIG. 1 |
| 2008/0128541 | A1 * | 6/2008 | Huang | B65H 75/4442 242/389 |
| 2010/0242232 | A1 * | 9/2010 | Wolner | A62B 35/0031 24/166 |
| 2010/0242233 | A1 | 9/2010 | Wolner | |
| 2014/0013635 | A1 * | 1/2014 | Cui | E02F 9/2841 37/456 |
| 2018/0023666 | A1 * | 1/2018 | Polak | B60P 7/083 24/69 ST |
| 2020/0039418 | A1 * | 2/2020 | Willodson | B60P 7/083 |
| 2020/0108283 | A1 * | 4/2020 | Auston | A62B 35/0025 |
| 2022/0096881 | A1 * | 3/2022 | Patton | A62B 35/0031 |
| 2022/0249887 | A1 * | 8/2022 | Leonardson | A62B 35/0037 |
| 2023/0364453 | A1 * | 11/2023 | Weiss | A62B 35/0025 |
| 2024/0139559 | A1 * | 5/2024 | Perner | A62B 35/0025 |
| 2024/0278049 | A1 * | 8/2024 | Safe | A62B 35/0018 |

FOREIGN PATENT DOCUMENTS

| | | | |
|---|---|---|---|
| WO | 2022043797 | A1 | 3/2022 |
| WO | 2022043818 | A1 | 3/2022 |
| WO | 2022263966 | A2 | 12/2022 |

* cited by examiner

STRAP ADJUSTER WITH TORQUE-LIMITING FUNCTIONALITY

BACKGROUND

Strap adjusters are often used e.g. with straps of harnesses, in order to tighten or loosen one or more straps so that the individual straps, and the harness as a whole, are appropriately fitted to a user. Harnesses with which strap adjusters may be used include e.g. fall-protection full-body safety harnesses of the general type often used with self-retracting lifelines or other types of fall-protection safety apparatus.

SUMMARY

In broad summary, herein is disclosed a strap adjuster comprising an adjustment knob and a biased pin. In one aspect, the adjustment knob may comprise a first interior annular collar that is configured to accept the head of the biased pin thereinto, the first interior annular collar comprising a first circumferentially-oriented notch defined on one circumferential end by a circumferential wall and defined on a second, opposing circumferential end by a circumferential ramp. In another aspect, the adjustment knob may comprise a second interior annular collar that is configured to accept the head of the biased pin thereinto, the second interior annular collar comprising a second circumferentially-oriented notch defined on one end by a circumferential wall and defined on a second, opposing circumferential end by a circumferential wall. These and other aspects will be apparent from the detailed description below. In no event, however, should this broad summary be construed to limit the claimable subject matter, whether such subject matter is presented in claims in the application as initially filed or in claims that are amended or otherwise presented in prosecution.

Like reference numbers in the various figures indicate like elements. Some elements may be present in identical or equivalent multiples; in such cases only one or more representative elements may be designated by a reference number but it will be understood that such reference numbers apply to all such identical elements. Unless otherwise indicated, all figures and drawings in this document are not to scale and are chosen for the purpose of illustrating different embodiments of the invention. In particular the dimensions of the various components are depicted in illustrative terms only, and no relationship between the dimensions of the various components should be inferred from the drawings, unless so indicated. Although terms such as "first" and "second" may be used in this disclosure, it should be understood that those terms are used in their relative sense only unless otherwise noted.

As used herein as a modifier to a property or attribute, the term "generally", unless otherwise specifically defined, means that the property or attribute would be readily recognizable by a person of ordinary skill but without requiring a high degree of approximation (e.g., within +/−20% for quantifiable properties). The term "substantially", unless otherwise specifically defined, means to a high degree of approximation (e.g., within +/−10% for quantifiable properties). The term "essentially" means to a very high degree of approximation; it will be understood that the phrase "at least essentially" subsumes the specific case of an "exact" match. However, even an "exact" match, or any other characterization using terms such as e.g. same, equal, identical, uniform, constant, and the like, will be understood to be within the usual tolerances or measuring error applicable to the particular circumstance rather than requiring absolute precision or a perfect match. The term "configured to" and like terms is at least as restrictive as the term "adapted to", and requires actual design intention to perform the specified function rather than mere physical capability of performing such a function. All references herein to numerical parameters (dimensions, ratios, and so on) are understood to be calculable (unless otherwise noted) by the use of average values derived from a number of measurements of the parameter.

DETAILED DESCRIPTION

Disclosed herein is a strap adjuster that can be used for tightening and/or loosening a strap. Such a strap adjuster may be used e.g. to take up excess (slack) length in a strap to tighten the strap, and/or to give out a previously taken-up length of the strap to loosen the strap, as discussed in detail later herein.

Figure 1:
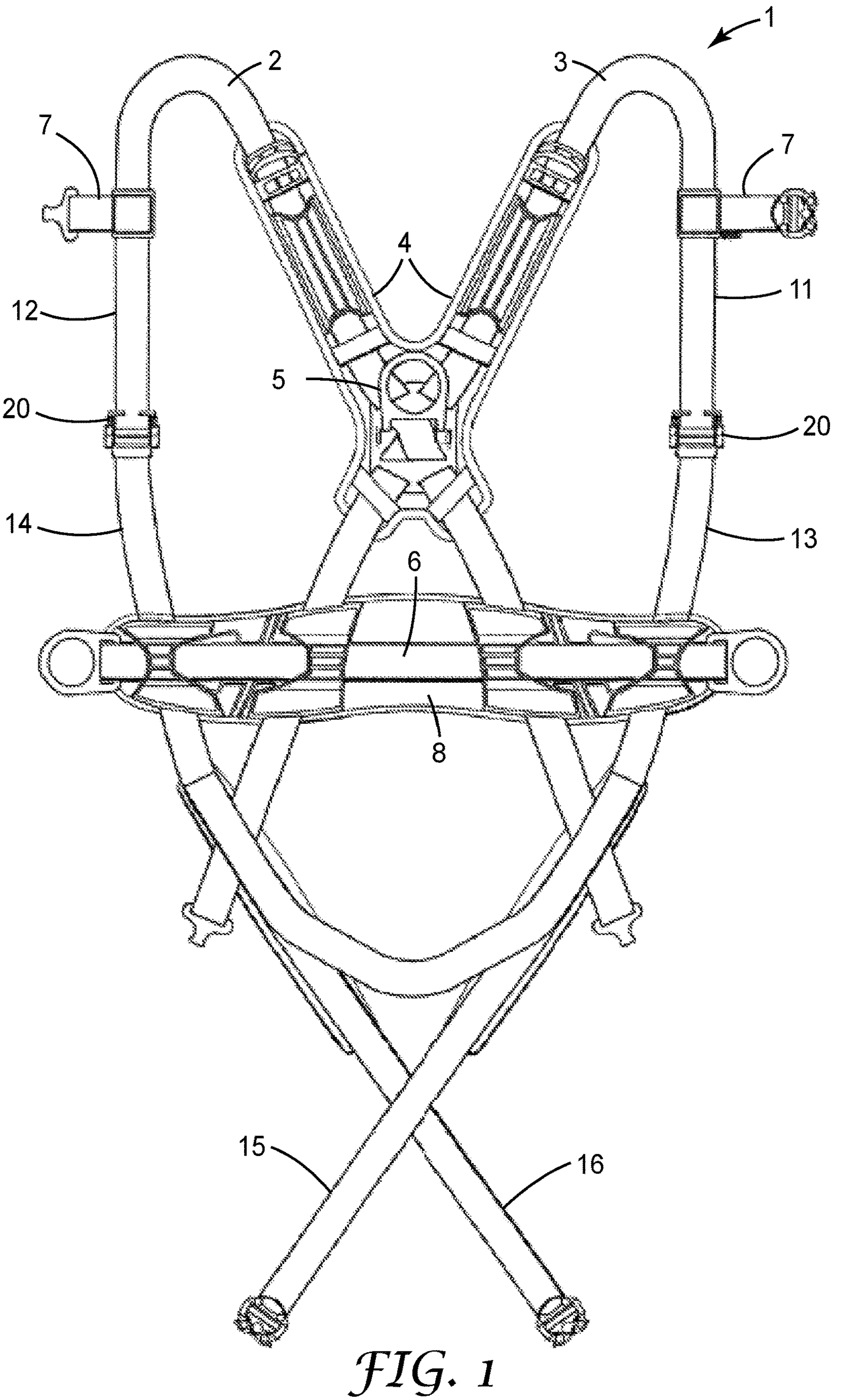
FIG. 1 is a rear view in generic representation of an exemplary fall-protection safety harness comprising at least one exemplary strap adjuster.
Figure 2:
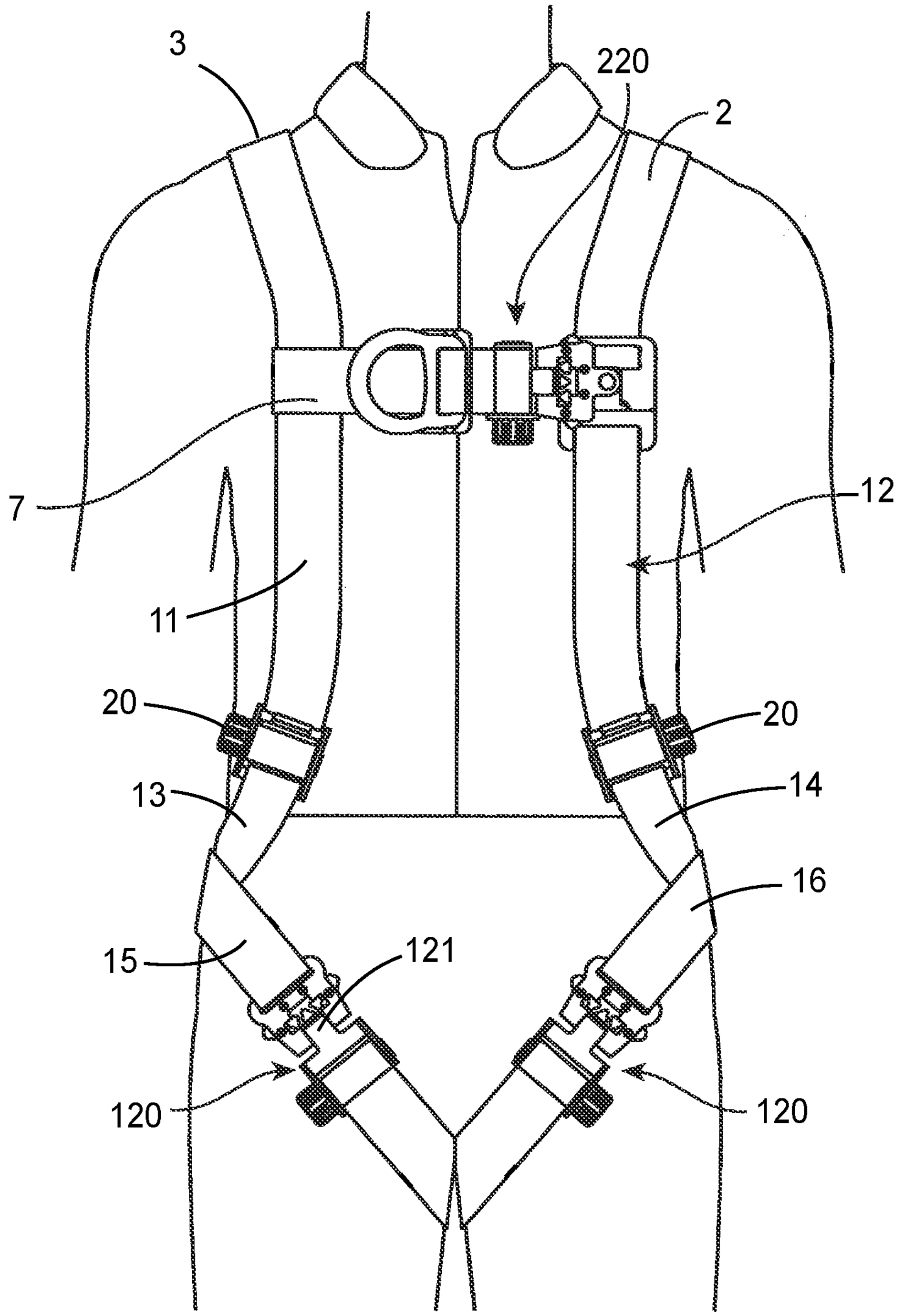
FIG. 2 is a rear view in generic representation of another exemplary fall-protection safety harness comprising at least one exemplary strap adjuster, as worn by a user.

In some embodiments, a strap adjuster as disclosed herein may be used with a harness, e.g. a fall-protection safety harness 1 as shown in exemplary representation in FIGS. 1 and 2. Such harnesses, often referred to as full-body safety harnesses, are used in various circumstances and workplaces in which persons are at elevated height or are otherwise at risk of falling. A fall-protection safety harness 1 is configured to serve in combination with a fall-protection apparatus such as a self-retracting lifeline or horizontal lifeline, a lanyard or the like, and so on. In ordinary use, at least one such fall-protection apparatus is typically connected to the safety harness, e.g. to a D-ring of the harness. Fall-protection full-body safety harnesses are required to meet various standards (as promulgated e.g. by ANSI), are required by OSHA for certain types of work activities, and will be distinguished from other types of harnesses such as e.g. SCBA harnesses, climbing harnesses, and general-use harnesses such as for backpacks, hiking, and the like.

As illustrated in generic representation in FIG. 1, a full-body fall-protection safety harness 1 will comprise first and second shoulder straps 2 and 3 that extend over the top of the shoulders as shown in FIG. 2 (noting that the harnesses of FIGS. 1 and 2 differ slightly in various aspects). Such straps are often comprised of flat webbing, made of e.g. woven synthetic fabric such as e.g. polyamide, polyaramid (such as e.g. Kevlar), ultra-high molecular weight polyethylene (such as e.g. Dyneema) and the like. Such straps are typically flexible (e.g. so that they can conform to the surface of a wearer's body, can be passed through one or more of buckles, guides, loops and the like, and so on) but typically are not significantly extensible. Other straps are also present, e.g. chest straps 11 and 12 that extend down the user's frontal torso, and leg straps 15 and 16. In some embodiments a harness may comprise a waist strap 6 that encircles the waist/hip area of the user. In some embodiments, a harness may include a cross-chest strap 7 that connects first and second chest straps 11 and 12.

Such straps are interconnected with each other to form the harness (some straps may be integral continuations of other straps, e.g. a chest strap may be an integral continuation of a shoulder strap) and are often fitted with various pads (e.g. shoulder pads 4 and waist/hip pad 8) to enhance the comfort of the harness, as well as various buckles, latches, connectors, loops, guides, additional pads such as e.g. chest pads and/or leg pads, and so on. Such components and exemplary arrangements of such components are described in, for example, U.S. Pat. Nos. 8,959,664, 9,174,073, and 10137322, all of which are incorporated by reference in their entirety herein. It will be understood that the particular arrangements of FIGS. 1 and 2 are exemplary representations; in actuality a safety harness may vary from the exact arrangements shown in these Figures. In many safety harness designs, first and second shoulder straps 2 and 3 meet, overlap and cross each other at a dorsal crossing area. In many embodiments, a dorsal D-ring 5 will be attached to the harness at the dorsal crossing areas shown in FIG. 5, e.g. to allow a safety line of a fall-protection safety apparatus to be attached to the harness. Other D-rings may also be present, as visible in FIGS. 1 and 2.

In some embodiments, one or more strap adjusters may be present to allow one or more of the straps of the harness to be adjusted. The exemplary depictions of FIGS. 1 and 2 show right and left strap adjusters 20 that are mounted on chest straps 11 and 12. In some embodiments, chest straps 11 and 12 may be connected, e.g. adjustably connected, to strap adjusters 20, with lower-torso straps 13 and 14 being connected (e.g. non-adjustably fixed) to strap adjusters 20 and continuing down to leg straps and/or a waist strap. (Such a combination of discrete upper and lower straps, e.g. straps 11 and 13 as depicted in FIGS. 1 and 2, are often referred to collectively as chest straps, ventral straps, or frontal torso straps.) In some embodiments, one or more strap adjusters may be provided on one or more straps that are not chest straps. For example, the exemplary arrangement of FIG. 2 includes strap adjusters 120 on right and left leg straps 15 and 16 as well as a strap adjuster 220 on cross-chest strap 7. In various embodiments, one or more strap adjusters may be present on any of these straps, and/or on a waist strap.

Figure 3:
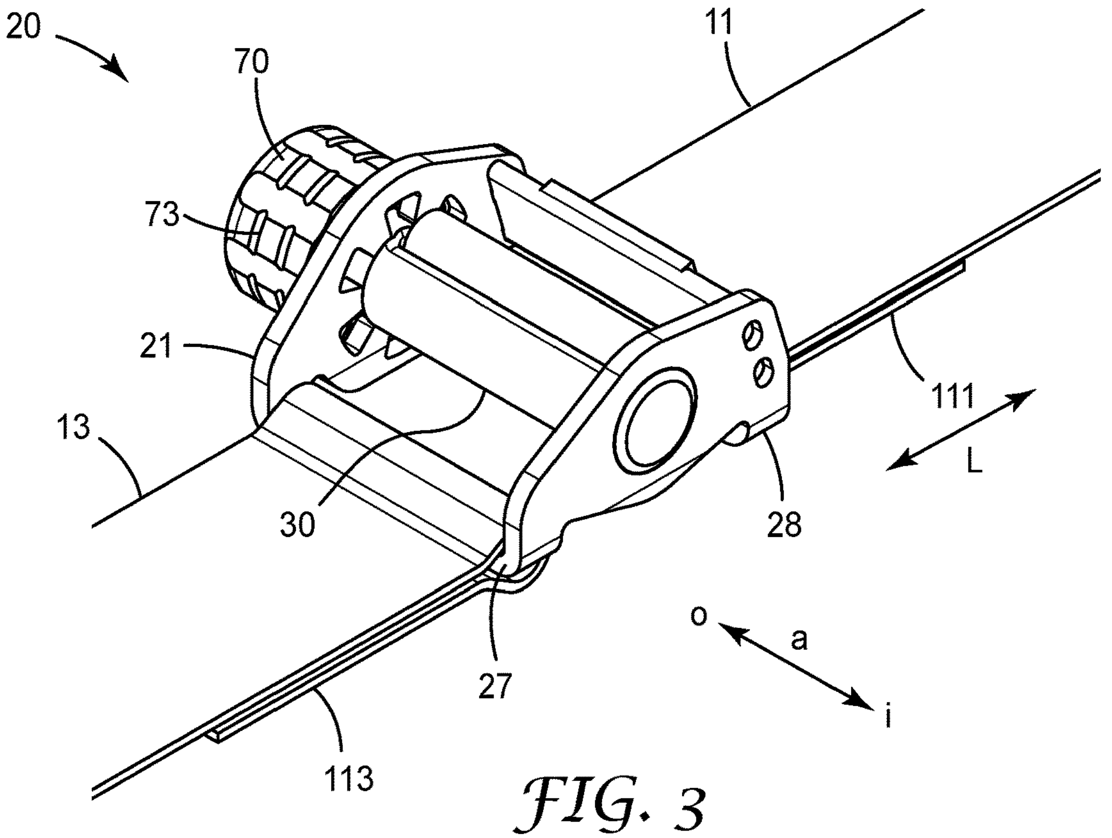
FIG. 3 is a perspective view of an exemplary strap adjuster and straps.
Figure 4:
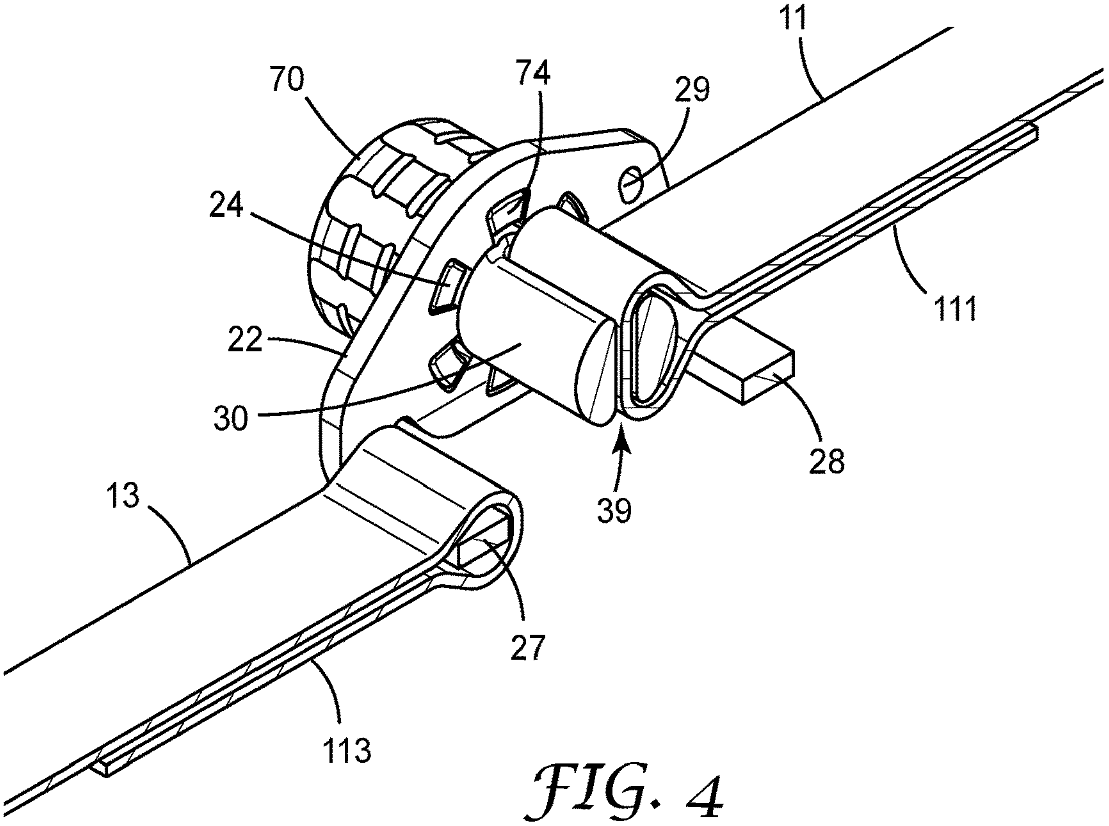
FIG. 4 is a perspective cross-sectional view of an exemplary strap adjuster and straps.
Figure 5:
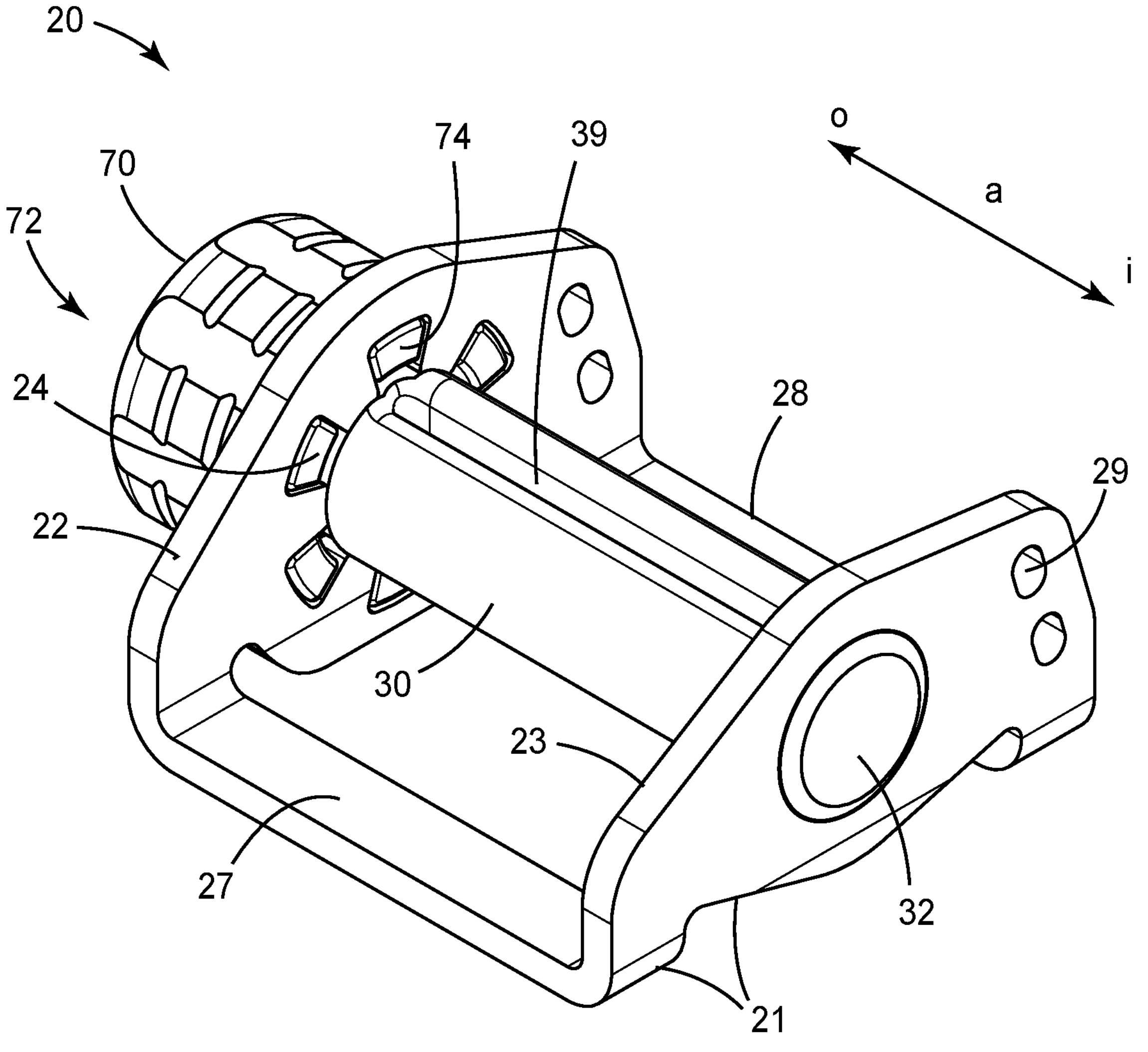
FIG. 5 is a perspective view of an exemplary strap adjuster in the absence of any straps.

An exemplary strap adjuster 20 is shown in FIGS. 3 and 4 with straps (in this case, a chest strap 11 and a lower-torso strap 13) attached thereto, and is shown in FIG. 5 with the straps omitted. Strap adjuster 20 will comprise a rigid frame 21 made of e.g. a metal such as steel; in the depicted embodiment, frame 21 comprises first and second sidewalls 22 and 23 that are connected to each other by crossbars 27 and 28. Frame 21 may take any suitable form; in some embodiments it may be a relatively open framework as in the Figures herein; in other embodiments it may provide a housing that at least partially encloses various items described below (and that has one or more slots to allow one or more straps to enter the housing). Even if frame 21 is relatively open, in some embodiments it may comprise a shield, partial housing, strap guide, or any like item. One such item of this general type is visible, unnumbered, in FIG. 3 (but is omitted from other Figures so that other components are more easily visible); such an item may be attached to the sidewalls of the frame e.g. by way of orifices 29 pointed out in FIG. 5.

Figure 6:
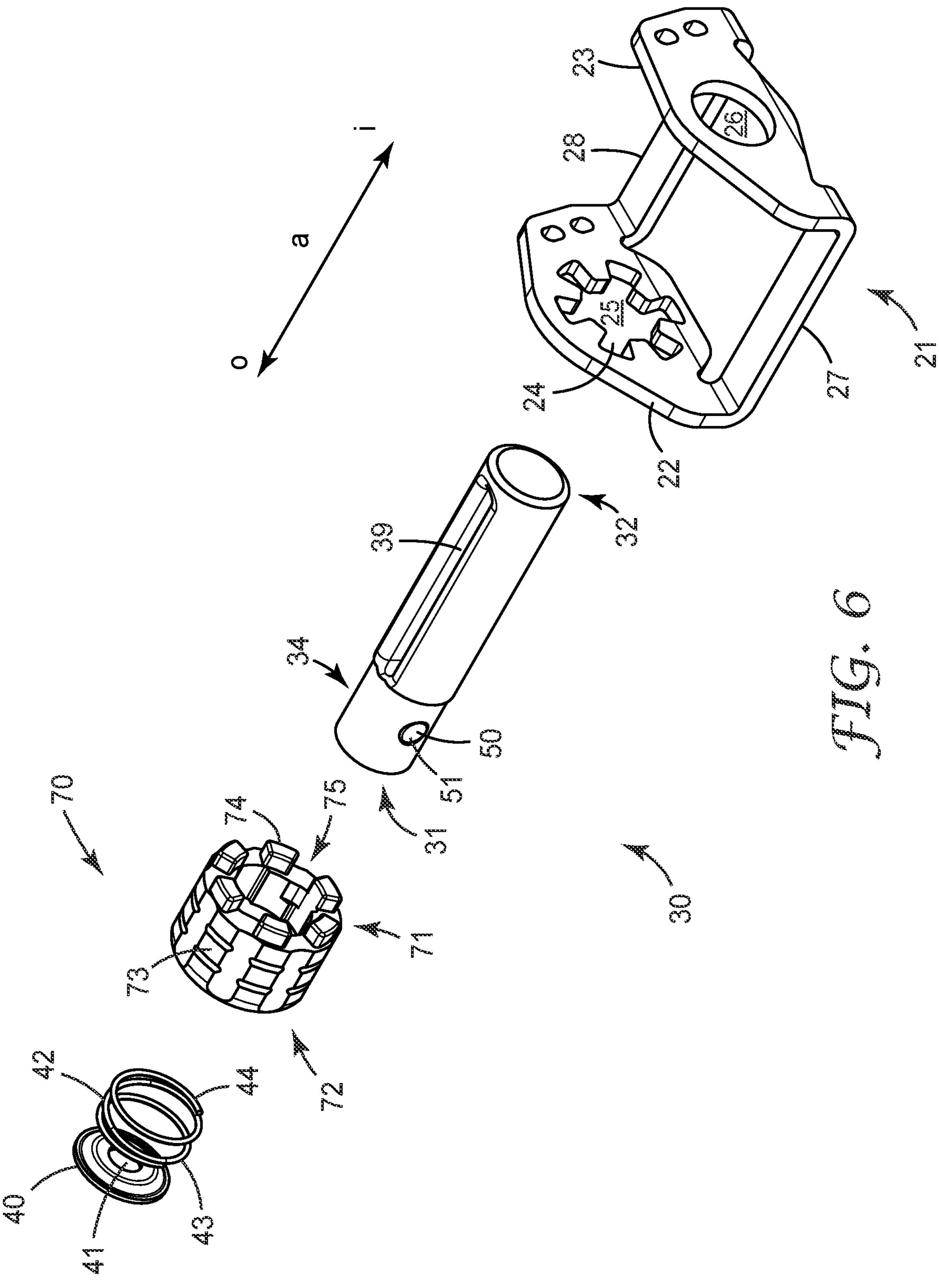
FIG. 6 is a partially exploded view of the exemplary strap adjuster of FIG. 5.

Strap adjuster 20 also comprises a shaft 30 (made of a rigid material, e.g. a metal such as aluminum or steel). A portion of a first end section 34 of shaft 30 is rotatably seated in a first shaft-seating opening 25 of first sidewall 22, and a second end 32 of shaft 30 is rotatably seated in a second shaft-seating opening 26 of second sidewall 23. Openings 25 and 26 are most easily seen in the exploded view of FIG. 6. Later discussions will make it clear that in many embodiments, opening 25 will be a through-opening that first end section 34 of shaft 30 passes through, while opening 26 may be a through-opening or may be a dead-end cavity that second end 32 of shaft is seated within. Shaft 30 comprises a long axis that defines an axial direction/axis of shaft 30, frame 21 and strap adjuster 20; this axial direction "a" is indicated in various Figures herein. Axial direction "a" will correspond to a lateral axis of the frame and of the strap adjuster, and will be orthogonal to the long axis "L" of a strap that is adjustably connected to the strap adjuster, as indicated in FIG. 3.

An end section 111 of a first strap (strap 11, in the depicted embodiment) is non-detachably attached to shaft 30. In the depicted embodiment (and most easily viewed in FIG. 4) this can be done by passing the end section 111 through a dedicated slot 39 in shaft 30 and joining the end section 111 to itself e.g. by stitching or in any other suitably permanent manner. An end section 113 of a second strap (strap 13, in the depicted embodiment) is non-detachably attached to crossbar 27, e.g. by joining the end section 113 to itself e.g. by stitching, in the general manner shown in FIGS. 3 and 4. Second strap 13 will thus be a "fixed" strap that is non-adjustably attached to strap adjuster 20. First strap 11, in contrast, is adjustably attached to strap adjuster 20, and is adjustable by rotating shaft 30 in a strap-winding direction so as to wind up a desired elongate portion of strap 11 onto shaft 30 and by rotating shaft 30 in a strap-unwinding direction so as to unwind a desired elongate portion of strap 11 from its wound-up condition on shaft 30.

Strap adjuster 20 is provided with an adjustment knob 70 to facilitate these operations. Adjustment knob 70 is disposed on first end section 34 of shaft 30, in a location that is axially (laterally) outward of first sidewall 22, as evident e.g. in FIG. 5. (As used herein, the terminology of inward and outward directions along axial direction "a" refer respectively to a direction away from adjustment knob 70 and to a direction toward adjustment knob 70, and are indicated as inward direction "i" and outward direction "o" in various Figures.) With adjustment knob 70 thus disposed on first end section 34 of shaft 30, at least a majority of first end section 34 of shaft 30 will reside within an internal cavity 75 of adjustment knob 70, at least when knob 70 is in a second, axially-inward position as described below. Adjustment knob 70 may be provided with a textured outer surface 73 to enhance the ability to grasp knob 70 with fingers. Adjustment knob 70 may be made of any suitable material; in some embodiments, a metal such as e.g. aluminum may be used.

In some embodiments, adjustment knob 70 is reversibly movable along the above-described axial direction “a”, between a first, axially outwardly retracted position and a second, resting position. (The term “retracted” thus denotes that knob 70 has been moved axially outward relative to frame 21 and specifically to first sidewall 22 thereof, noting again that this axial direction corresponds to the lateral direction of the frame). The second, resting position is axially inward of the first, axially outwardly retracted position.

When knob 70 is in the second, resting position, at least one tooth 74 that is located on an axially inward side of knob 70 and that is axially-inwardly-facing, will fit at least partially within a complementary aperture 24 of first sidewall 22 of frame 21, so that knob 70 cannot rotate (in any direction) while in the second, resting position. Any suitable number of teeth (and corresponding apertures) may be used, e.g. one, two, three, four, five, six, or more. In the depicted embodiment most easily seen in FIG. 6, knob 70 has six such teeth 74 and sidewall 22 has six complementary apertures to at least partially receive the teeth. If multiple teeth and apertures are used, they may be circumferentially spaced in the general manner evident in FIG. 6 (in the depicted design, the six teeth/apertures are spaced at intervals of 60 degrees). Typically, when knob 70 is in the second, resting position, all of the teeth 74 will reside at least partially within their respective complementary apertures, as seen in FIGS. 3-5 (in all of which knob 70 is in its second, resting, axially-inward position).

With such an arrangement, adjustment knob 70 is not rotatable while in the second, resting position, due to the interference of the apertures 24 of frame sidewall 22 with the teeth 74 of the knob. However, adjustment knob 70 can be retracted axially outward to a first, axially outwardly retracted position in which teeth 74 are clear of apertures 24 and thus allow knob 70 to be rotated.

Figure 9:
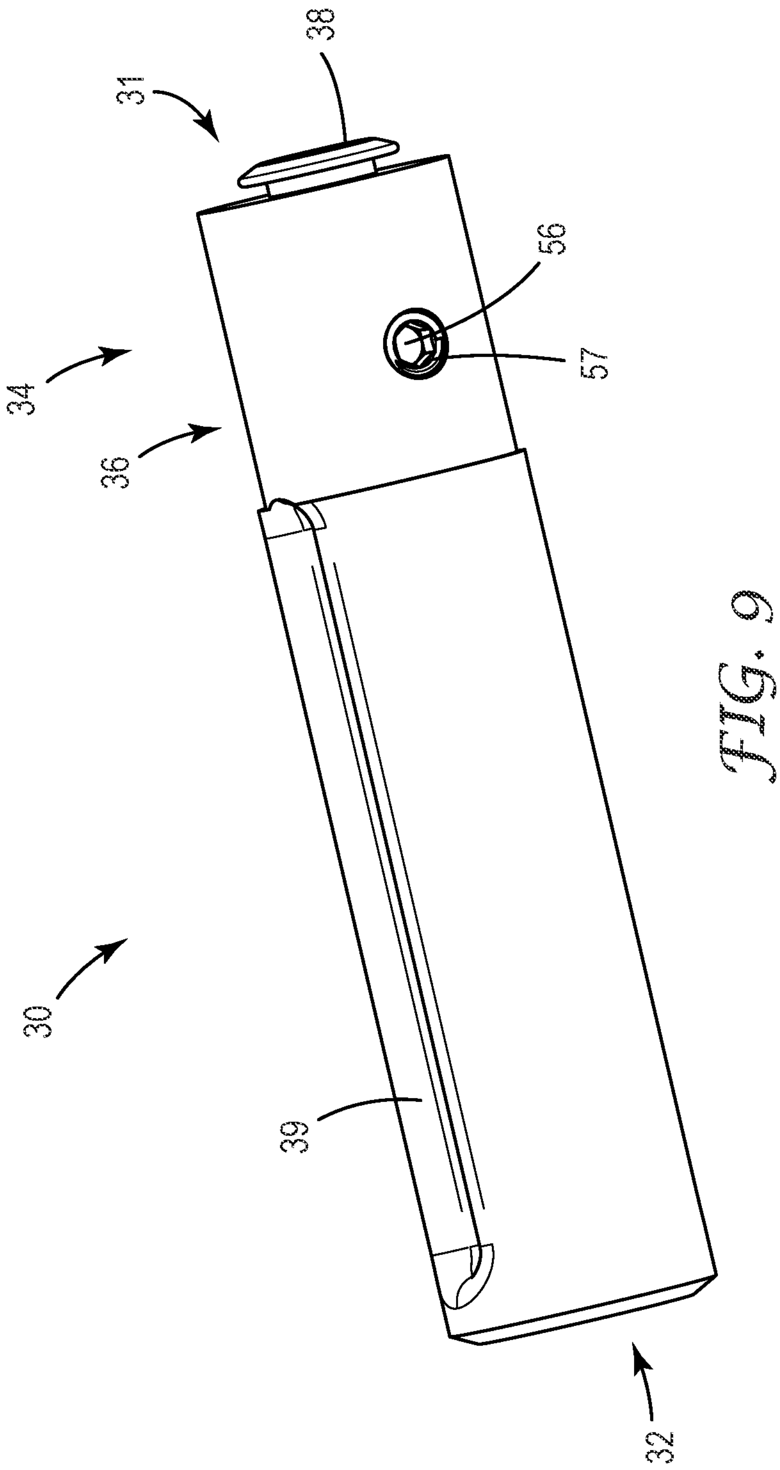
FIG. 9 is an isolated perspective view of an exemplary shaft usable in a strap adjuster.

In some embodiments, adjustment knob 70 may be biased axially inwardly toward the second, resting position. This can provide that knob 70 will spend the majority of its time in this second, resting position, excepting when knob 70 is actively grasped and retracted axially outward, overcoming the biasing force. In some embodiments, knob 70 may be biased by an arrangement of the general type shown in FIG. 6. Such an arrangement may make use of a retaining plate 40 that comprises an orifice 41 that allows retaining plate 40 to be mounted on an end flange 38 of shaft 30 (end flange 38 is visible in FIG. 9). Retaining plate 40 is thus fixedly attached to first end 31 of shaft 30. A coil spring 42 can be positioned such that an axially outward end 43 of spring 42 abuts against, and is supported by, retaining plate 40. Spring 42 can extend axially inward into an axially-outward opening 76 of outward end 72 of adjustment knob 70. Spring 42 can be located within a generally cylindrical space 77 provided within knob 70, with an axially inward end 44 of spring 42 being abutted against an axially-outward-facing shoulder 78 provided within knob 70, (these features of knob 70 are most easily seen in FIG. 11). Coil spring 42 is thus held in at least slight compression, and thus imparts a biasing force on knob 70 that urges knob 70 in an axially inward direction. Various geometric and material properties (e.g. the geometric parameters of coil spring 42 and the material of which coil spring 42 is made, and so on) can be chosen so that coil spring 42 imparts the desired biasing force.

Adjustment knob 70 and strap-bearing shaft 30 will not be fixed to each other so that they must always co-rotate (or remain stationary) with each other. Rather, knob 70 and shaft 30 are configured to so that with knob 70 in the above-described first, axially outwardly retracted position, shaft 30, although always able to co-rotate with knob 70 in a strap-unwinding direction, will co-rotate with knob 70 in a strap-winding direction under some conditions but will cease co-rotating with knob 70 in the strap-winding direction under other conditions.

Interactions between adjustment knob 70 and strap-bearing shaft 30 to achieve the above effects can be facilitated by the use of a pin 50. Pin 50 will be mounted in a radial bore 35 located in first end section 34 of shaft 30 as seen e.g. in FIGS. 6-9. By a radial bore is meant a cavity that has a radially outward open end 36 at the radially outward surface of shaft 30. Bore 35 will extend radially inward into shaft 30 and will have a second end 37 that opposes first open end 36. In some embodiments bore 35 may extend through the entire diametrical thickness of shaft 30 so that second end 37 is an open end (although it may be occupied e.g. by a set screw as discussed later herein). In other embodiments radial bore 35 may be a “blind” bore that dead-ends within the interior of shaft 30, also as discussed later herein.

Pin 50 will be mounted in radial bore 35 so that a radially-outward head 51 of pin 50 is located proximate the first, open end 36 of bore 35 (in many embodiments, head 51 of pin 50 may be located approximately flush with the radially outward surface of shaft 30). Such arrangements are most visible in FIG. 6 and in the partially-exploded view of FIG. 7. Pin 50 is biased so that head 51 of pin 50 is urged radially outward from first, open end 36 of bore 35. In many embodiments, this can be facilitated by an arrangement of the general type depicted in FIGS. 7 and 8, in which pin 50 is biased by a coil spring 53. In the depicted embodiment, coil spring 53 is disposed at least partly within a radially-inward-facing cavity 52 within pin 50, with the radially-outward head 54 of spring 53 abutting against an interior surface of pin 50 within cavity 52. The opposing end 55 of spring 53 is abutted against a spring-supporting surface 57. In the depicted embodiment, spring-supporting surface 57 against which opposing end 55 of spring 53 is abutted, is a surface of a set screw 56 that is mounted in a second, open end 37 of bore 35 (second open end 37 of bore 35, and set screw 56 mounted therein, are most easily seen in the isolated view of shaft 30 in FIG. 9).

Coil spring 53 is held in at least slight compression so as to impart a biasing force on pin 50 that urges head 51 of pin 50 in a radially outward direction relative to shaft 30. Various geometric and material properties (e.g. the geometric parameters of coil spring 53, the material of which coil spring 53 is made, and so on) can be chosen so that coil spring 53 imparts the desired biasing force. In some embodiments, the force exerted by coil spring 53 may be adjustable by adjusting (turning) set screw 56 so as to put coil spring 53 in a desired state of compression. Thus in some embodiments, multiple strap adjusters 20 may be produced with the same components and in the same general arrangement, but with different strap adjusters having biased pins 50 that are subject to different biasing forces depending on the setting of their set screws 56. In some embodiments, spring-supporting surface 57 against which opposing end 55 of spring 53 is abutted, may be fixed (e.g. factory-set and non-adjustable). This may be achieved e.g. by providing radial bore 35 in the form of a blind cavity in which second, opposing end 37 of bore 35 is provided by the material of shaft 30 itself, at the terminus of the blind bore. Or, if a set screw is used, the set screw may be factory-set to a desired value and may then be permanently held in place e.g. by a threadlocker.

Biased pin 50 (as well as coil spring 53, and set screw 56 if present) is a durable item, made e.g. of a suitable metal. Biased pin 50 is not configured to permanently deform, break or shatter upon the application of a high force to pin 50 during use of the strap adjuster. In other words, biased pin 50 is not, and will not function in the manner of, a shear pin of the general type sometimes used in drive trains, snow-blower augers, and the like. Arrangements of the general type discussed above can provide a biased pin 50 that facilitates interaction between a strap-bearing shaft 30 and an adjustment knob 70 so that the effects described herein may be achieved. These arrangements can be used in combination with features of adjustment knob 70 that will now be described.

Figure 10:
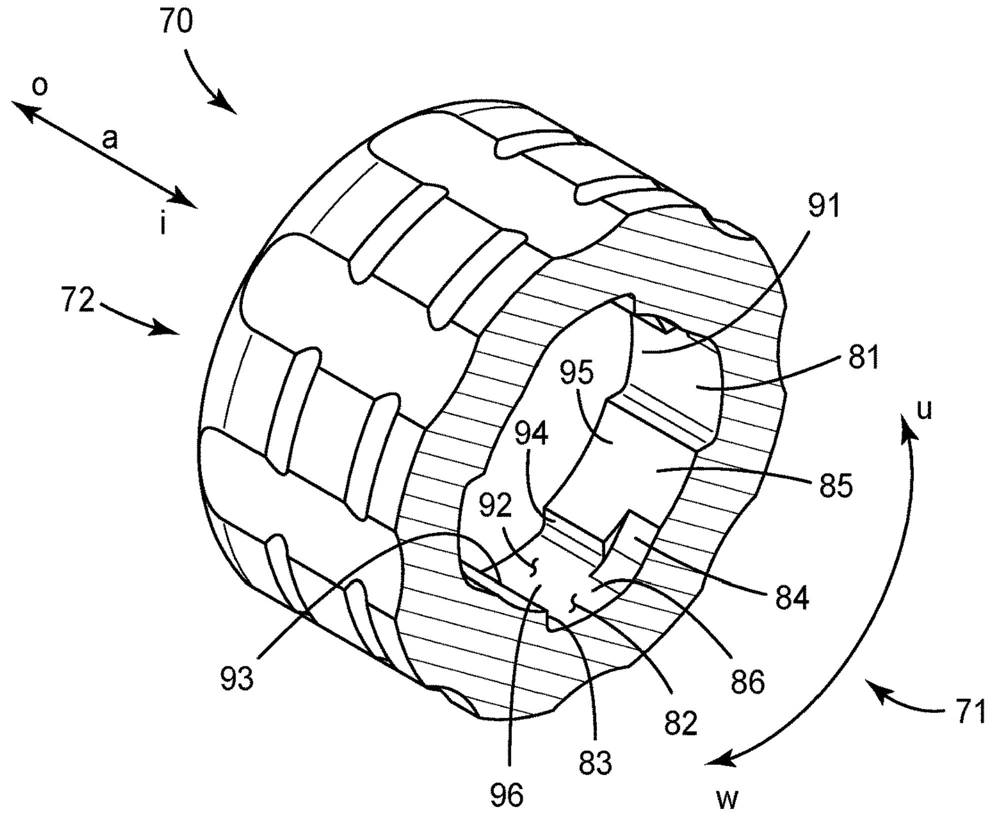
FIG. 10 is a cross-sectional perspective view of an exemplary adjustable knob of a strap adjuster as disclosed herein.
Figure 11:
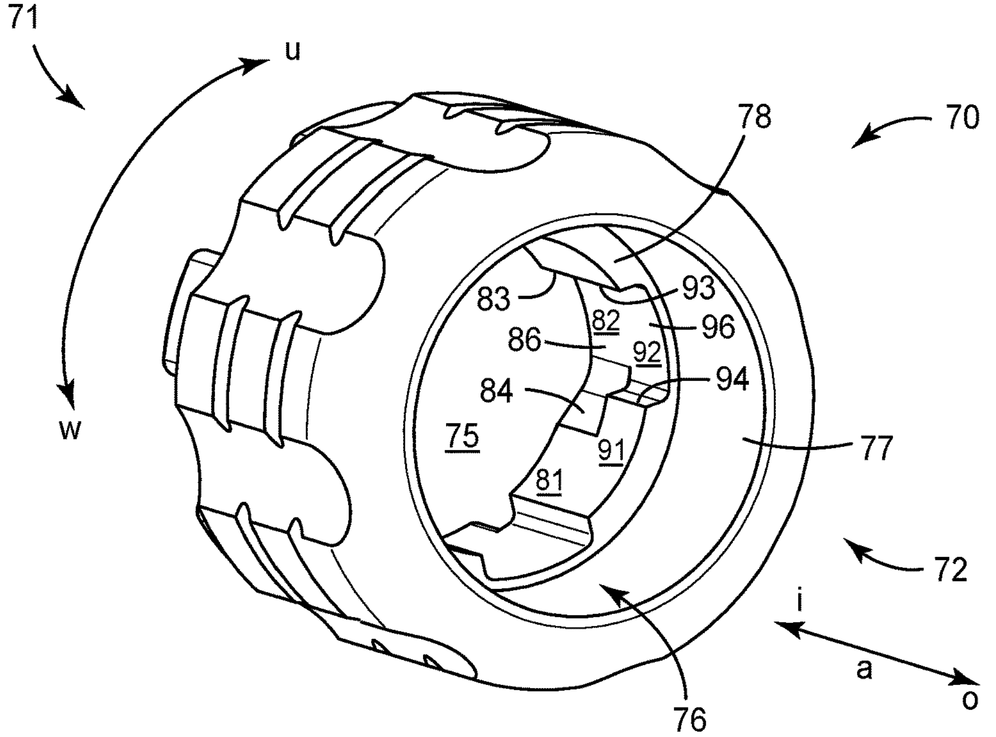
FIG. 11 is a cross-sectional perspective of the exemplary adjustable knob of FIG. 10, viewed from a different perspective.

Adjustment knob 70 is configured so that a first portion of a radially-inward surface of adjustment knob (i.e., within the above-described cavity 75) defines a first interior annular collar 81, as visible in FIGS. 10 and 11 (noting that FIGS. 10 and 11 are cross-sectional views of knob 70, with the cross-sectional cut being taken so that only a portion of the axial extent of annular collar 81 visible). First interior annular collar 81 is configured to accept the above-described head 51 of biased pin 50 thereinto (e.g. when adjustment knob 70 is in a first, axially-retracted position); collar 81 comprises at least one notch 82 that is configured to accept head 51 thereinto under circumstances as described herein. The at least one notch 82 is circumferentially oriented and is defined on a first circumferential end by a circumferential wall 83 as visible in FIGS. 10 and 11. Here and elsewhere, by a wall is meant an item that rises from the radially-outward "floor" 86 of notch 82 at an angle of at least 60 degrees and that extends radially inward from floor 86 of notch 82 to a "height" of at least 0.5 mm relative to floor 86. Such an angle will be evaluated while viewing knob 70 along the axial direction, and will be measured between a local plane that is tangent to the wall and a local plane that is tangent to the floor of the notch at a location close to the junction of the floor with the wall (the vertex of the angle will thus closely coincide with the junction of the wall with the floor). The angle is an included angle, with an angle of 90 degrees denoting a "vertical" wall and an angle of 0 degrees denoting no wall (or ramp, as described below) at all but rather signifying a uniform continuation of the floor of the notch. By a "circumferential" wall is meant a wall that is encountered when traversing along notch 82 in a circumferential direction; such a wall may extend at least generally axially along the axial extent of notch 82, as with wall 83 as depicted in FIGS. 10 and 11.

The at least one notch 82 of first interior annular collar 81 is defined on a second, opposing circumferential end by a circumferential ramp 84, as visible in FIGS. 10 and 11. Notch 82 thus comprises a first circumferential end with a wall 83 and a second, opposing circumferential end with a ramp 84, as evident in FIGS. 10 and 11. The term circumferential ramp is defined in analogous manner to the term circumferential wall, with a ramp rising from the floor 86 of notch 82 at an angle of less than 60 degrees to a height of at least 0.5 mm.

An arrangement in which a circumferential notch 82 of adjustment knob 70 is defined at a first circumferential end by a wall 83 and at a second, opposing circumferential end by a ramp 84, can provide that the knob will interact with a biased pin 50 of a shaft 30 in an asymmetric manner. Specifically, adjustment knob 70 can be rotated in a direction that causes a head 51 of a biased pin 50 that is located within notch 82, to be impinged upon by wall 83. The steepness of wall 83 prevents pin head 51 from "climbing" wall 83; pin head 51 will thus remain abutted against wall 83 and shaft 30 will co-rotate with adjustment knob 70 as adjustment knob 70 is rotated in this direction.

However, rotation of adjustment of knob 70 in an opposite direction will cause different behavior. Rotating knob 70 in this opposite direction (which will be referred to as a torque-limited direction as made clear by the following discussion) will cause head 51 of pin 50 to be impinged upon by ramp 84 rather than by wall 83. As long as the torque that is applied to knob 70 remains below a predetermined threshold, pin head 51 can remain abutted against the foot of ramp 84 and the torque that is applied to knob 70 (and thus to ramp 84) will cause pin 50 (and thus shaft 30) to co-rotate with knob 70. However, if the torque that is applied to knob 70 exceeds the above-mentioned threshold, the gradual slope of ramp 84 (in contrast to a steep wall 83) allows ramp 84 to begin to slidably move along head 51 of pin 50. In doing so, ramp 84 will urge pin 50 radially inward (overcoming the biasing force of coil spring 53).

Continued rotation of knob 70 at this high level of torque will cause ramp 84 to continue to slidably move along pin head 51 (followed by plateau 85 of annular collar 81 slidably moving along pin head 51). In other words, once the force that is applied by ramp 84 to pin head 51 exceeds a specified threshold, pin 50 will be pushed radially inward within bore 35 by ramp 84 so that ramp 84 is no longer able to apply sufficient torque to pin head 51 to cause pin 50 (and thus shaft 30) to continue to rotate. Rather, further rotation of knob 70 will cause knob 70 to continue to rotate independently of shaft 30, which will have ceased rotating. Adjustment knob 70 and strap-bearing shaft 30 will thus have become decoupled from each other so that rotation of knob 70 no longer causes commensurate rotation of shaft 30. Such an arrangement, in which a sufficiently high torque applied to knob 70 causes shaft 30 to become decoupled from knob 70, is what is meant by a strap adjuster exhibiting a torque-limiting functionality. In other words, with knob 70 in the first, axially outwardly retracted position, no matter how great a torque may be applied to knob 70 in the torque-limited rotation direction, this torque will not reach shaft 30 in a manner that causes shaft 30 to rotate further.

The above-described arrangements can be configured so that rotation of adjustment knob 70 in a strap-unwinding direction causes head 51 of pin 50 of strap-bearing shaft 30 to be impinged upon by wall 83 of notch 82, so that shaft 30 will co-rotate with knob 70 in this direction irrespective of the particular torque that is applied to knob 70. (Strap-winding and strap-unwinding directions "w" and "u" are indicated in FIGS. 10 and 11.) In contrast, rotation of adjustment knob 70 in a strap-winding direction causes head 51 of pin 50 of strap-bearing shaft 30 to be impinged upon by ramp 84 of notch 82. This will have the result that shaft 30 will only co-rotate with knob 70 until a certain point; specifically, a point at which the strap that is attached to shaft 30 has been tightened so that it is now exerting a force that opposes any further rotation of shaft 30. At this point, further rotation of knob 70 in this strap-winding direction will cause ramp 84 to urge pin 50 radially inward into bore 35 so that movement of knob 70 and ramp 84 no longer exerts sufficient torque on head 51 of pin 50 to cause shaft 30 to rotate any further. Knob 70 will thus decouple from shaft 30 as described above. Such arrangements can provide that a strap adjuster 20 can tighten a strap to a predetermined amount, after which further rotation of knob 70 does not cause any additional tightening of the strap. Once the decoupling occurs, any slight tendency of shaft 30 to counter-rotate in the opposite direction (i.e., to unwind the strap) under the force applied by the tensioned strap will cease as soon as this counter-rotation in the opposite direction causes pin head 51 to impinge against a wall 83 of knob 70. Shaft 30 is thus substantially unable to counter-rotate relative to knob 70 in the strap-unwinding direction other than a very limited amount commensurate with the head 51 of pin 50 moving along a notch 82 to reach a wall 83 thereof. (This will be considered to meet the condition that shaft 30 is substantially prevented from counter-rotating relative to knob 70 in the strap-unwinding direction). In other words, once a strap is sufficiently tightened, it will not be able to unwind as long as the user is grasping knob 70 to prevent knob 70, and thus shaft 30, from rotating in a strap-unwinding direction.

Within the general outlines provided above, any suitable arrangement may be chosen. It will be appreciated that various straps (e.g. a strap of a fall-protection full-body safety harness versus a strap of e.g. a backpack harness or general-purpose harness) may be adjusted, e.g. tightened, to different degrees. Any of the above-discussed parameters (e.g. the steepness of a wall 83 and/or of a ramp 84, the biasing force exerted on pin 50, and so on), may be chosen as desired for a particular type of harness and use. Other parameters (e.g. the sharpness or roundedness of the edges of head 51 of pin 50) may be similarly chosen as desired to achieve the desired effects.

In various embodiments, a wall 83 may rise from the floor 86 of notch 82 at an angle of at least 65, 70, 75, 80, or 85 degrees. In some embodiments, such a wall may exhibit an angle of approximately 90 degrees, e.g. so that the wall rises more or less straight up (in a radially-outward sense) from floor 86 of notch 82. In various embodiments, a ramp 84 may rise from the floor of notch 82 at an angle of at most 50, 45, 40, 35, 30 or 25 degrees. In various embodiments, such a ramp may rise from floor 86 at an angle of at least 5, 10, 20, or 25 degrees. A wall or a ramp may exhibit an angle that is constant over the extent of the wall or ramp; or, the angle may change at least slightly from the radially-outwardmost “bottom” of the wall or ramp to the radially-inwardmost “top” of the wall or ramp. (In such a case, a best-fit tangent plane to the wall or ramp may be selected for the purpose of evaluating the overall angle of the wall or ramp.)

In addition to the absolute values of the wall angle and ramp angle, the difference between these angles may be suitably chosen. For example, such a wall angle—ramp angle difference may be at least 10, 20, 30, 40, or 50 degrees (and, again, such a parameter may be chosen along with various of the other above-mentioned parameters, to achieve the desired overall effect). By way of a specific example, the exemplary walls 83 and ramps 84 of notches 82 as depicted in FIGS. 10 and 11 exhibit a wall angle in the range of approximately 70-75 degrees, a ramp angle in the range of approximately 30-35 degrees, and a wall angle—ramp angle difference in the range of approximately 35-45 degrees. It will thus be appreciated that the difference between the ramp angle and wall angle may not necessarily need to be extreme (e.g. it need not necessarily approach 70 or 80 degrees), as long as it is sufficient (along with the various other parameters) to achieve the effects disclosed herein.

In various embodiments, the height (along a radially inward-outward direction) of a wall, and/or of a ramp, relative to the floor of the notch, may be any suitable value. In some embodiments, a wall and/or a ramp may exhibit a height of at least 0.8, 1.0, 1.2, 1.4, or 1.6 mm. In further embodiments, a wall and/or a ramp may exhibit a height of at most 3.0, 2.5, 2.0, or 1.5 mm. In many embodiments, the wall 83 and ramp 84 of a notch (and of multiple notches, if such notches are present as discussed below) will be equal in height, as evident in FIGS. 10 and 11.

According to the disclosures herein, at least one notch 82, with a wall 83 at one circumferential end of the notch and a ramp 84 at an opposing circumferential end, of the notch will be present in first interior annular collar 81. In some embodiments, multiple such notches, walls and ramps may be present, e.g. spaced circumferentially along annular collar 81. In various embodiments, two, three, four, five, or six such notches (and corresponding walls and ramps) may be present. In the depicted exemplary embodiment shown in FIGS. 10 and 11, four such notches are present (not all of them are visible in FIG. 11). The notches are circumferentially evenly spaced apart and are separated from each other by plateaus 85.

As adjustment knob 70 is rotated to remove the “slack” from a strap by winding the “excess” portion of the strap upon shaft 30, the eventual tightening of the strap will cause the above-described effects. That is, head 51 of pin 50 that is present within a notch 82, will slidably move along ramp 84 (strictly speaking, it is knob 70 and ramp 84 that are moving with respect to pin 50, but movement of pin 50 is referred to here for ease of description). Head 51 of pin 50 will reach the top (radially inwardmost) edge of ramp 84 and then (with continued rotation of knob 70) will traverse circumferentially along plateau 85. As head 51 of pin 50 traverses across plateau 85, it will eventually reach the wall 83 of a neighboring notch 82. As pin head 51 continues moving circumferentially, it will “fall off” wall 83 into this neighboring notch 82. That is, pin 50, once it moves circumferentially off of plateau 85, will move quickly radially outward under the above-discussed biasing force of coil spring 53, so that head 51 of pin 50 strikes the floor 86 of neighboring notch 82. The impact of head 51 on floor 86 can be sufficient to make an audible noise (e.g. a click). Continued rotation of knob 70 will cause pin 50 to climb the ramp 84 of this neighboring notch 82 and to traverse the next plateau 85, to fall into the next notch 82 and impact its floor 86, and so on.

Continued rotation of knob 70 after the torque threshold has been exceeded will thus cause a series of clicks as pin 50 sequentially strikes the floors 86 of successive notches 82. In the depicted embodiment, with four notches 82 spaced circumferentially along annular collar 81, there will be four clicks for every full (360°) rotation of knob 70. Such arrangements can advantageously provide that once the tightening of the strap has reached the desired threshold, further rotation of knob 70 will cause a series of audible clicks, thus providing confirmation that the desired degree of strap-tightening has been achieved and that rotation of knob 70 can be discontinued.

In some embodiments, adjustment knob 70 may be configured so that a second portion of the radially-inward surface of adjustment knob 70 (i.e., within the above-described cavity 75) defines a second interior annular collar 91, as visible in FIGS. 10 and 11. Second interior annular collar 91 is configured to accept the above-described head 51 of biased pin 50 thereinto and comprises at least one notch 92 that is configured to accept head 51 thereinto under certain circumstances, in generally similar manner as described above for first annular collar 81 and notch 82 thereof. The at least one notch 92 is generally circumferentially oriented and is defined on a first circumferential end by a first circumferential wall 93 as evident in FIGS. 10 and 11. In some embodiments, first circumferential wall 93 of notch

92 of second interior annular collar 91 may be very similar to (in fact may be a smooth axial continuation of) circumferential wall 83 of notch 82 of first interior annular collar 81, as evident from FIGS. 10 and 11. The at least one notch 92 of second interior annular collar 91 is defined on a second, opposing circumferential end by a second circumferential wall 94, again as visible in FIGS. 10 and 11. In some embodiments, this second circumferential wall 94 of notch 92 may be similar or identical to first circumferential wall 93 of notch 92, although oppositely-circumferentially-oriented.

Second annular collar 91 thus differs from first annular collar 81 in that second collar 91 has notches 92 with walls at each end, rather than having notches with a ramp at one end and a wall at the other end in the manner of first collar 81. Such a design can provide that when biased pin 50 is positioned in second annular collar 91 of knob 70, knob 70 will interact with the biased pin 50 (and thus with shaft 30) in a symmetric manner. Specifically, rotation of knob 70 in either direction (the strap-winding direction "w" or the strap-unwinding direction "u") will cause head 51 of pin 50 to impinge on an (unclimbable) wall 93 or 94 of a notch 92. So, when adjustment knob 70 is disposed (e.g. in a second, resting position) so that pin 50 is located within annular collar 91 rather than within annular collar 81, knob 70 and shaft 30 will remain fixed to each other (within the limits established by the circumferential length of each notch 92) so that they co-rotate with each other (or both remain stationary) rather than decoupling so that one is able to rotate independently of the other.

In some embodiments, a second annular collar 91 will be positioned axially outward from first annular collar 81. And, in some embodiments adjustment knob 70 will be movable along the axial direction between a first, axially outwardly retracted position in which the head 51 of biased pin 50 is axially aligned with, and resides within, the above-described first annular collar 81, and a second, axially inward position in which head 51 of pin 50 is axially aligned with, and resides within, the second annular collar 91. In some embodiments, the number of notches 92 of second annular collar 91 may be equal to the number of notches 82 of first annular collar 81. Notches 92 of second collar 91 may be circumferentially spaced, may exhibit floors 96, and may be separated by plateaus 95, all in similar manner as for notches 82 of first collar 81 and as evident in FIGS. 10 and 11. In many embodiments, the radially inward-outward height of plateaus 95 of second annular collar 91 will be the same as the height of plateaus 85 of first annular collar 81, as evident from FIGS. 10 and 11. Similarly, the floors 96 of notches 92 of second collars 91 may be at positioned at the same radially inward-outward location as floors 86 of notches 82 of first collars 81, also as evident from FIGS. 10 and 11.

In some embodiments, each notch 92 of second collar 91 may be circumferentially aligned with a notch 82 of first collar 81 (as is evident with notches 82 and 92 as visible in FIGS. 10 and 11) to enhance the ability of pin head 51 to move between a notch 82 and a notch 92 upon axial movement of knob 70 (again, strictly speaking it is knob 70, collars 81 and 91, and notches 82 and 92, that are actually moving relative to shaft 30 and pin 50).

When knob 70 is in the first, axially outwardly retracted position knob 70 and shaft 30 are asymmetrically coupled as described above; when knob 70 is in the second, axially inward position knob 70 and shaft 30 are symmetrically coupled so that they co-rotate together or remain stationary together. In some embodiments, adjustment knob 70 may be axially inwardly biased (e.g. by a biasing spring 42) in the manner described earlier herein; in such embodiments, the second, axially inward position of knob 70 may be a "resting" position into which knob 70 is urged by the biasing force and in which knob 70 remains in the absence of any force that is applied to overcome the biasing force.

As discussed earlier, in some embodiments adjustment knob 70 may comprise at least one radially inwardly facing tooth 74 that is configured to be at least partially seated in a complementary aperture 24 of a sidewall of the frame of the strap adjuster. In some such embodiments, the strap adjuster may be configured so that any such tooth or teeth are seated in any such complementary aperture, when knob 70 is in the second, (e.g. resting) axially-inward position. Recalling that a tooth 74 of adjustment knob 70 being at least partially seated in any such aperture 24 will prevent knob 70 from rotating (in any direction), such arrangements can provide that when knob 70 is in the second, axially inward position, knob 70 will be prevented from rotating. In some embodiments such arrangements can be combined with the above-described configuration in which with knob 70 in the second, axially inward position, biased pin 50 will reside in the second annular collar 91 (with notches that are terminated by walls at both ends) so that shaft 30 will be substantially unable to rotate relative to knob 70 (except to a very limited extent commensurate with the circumferential length of the notch 92 in which the head 51 of pin 50 is seated). Thus, in some embodiments, when adjustment knob 70 is in the second, axially inward position, knob 70 will be unable to rotate relative to frame 21 and shaft 30 will be substantially unable to rotate relative to knob 70. And, in some embodiments knob 70 may be biased axially inward so that this second, axially inward position is a resting position in which knob 70 remains unless a force is applied to overcome the biasing force.

Thus in some embodiments, a strap adjuster may be configured so that the adjustment knob 70 remains, at most times, in a second, axially inward, resting position in which knob 70 is unable to turn relative to frame 21 and shaft 30 is substantially unable to rotate relative to knob 70. Knob 70 can then be purposely axially retracted (e.g. by the fingers of a user) to a first, axially retracted position. With the knob in this first axial position the knob can be rotated in a strap-winding direction to tighten the strap, with the rotating continuing until the strap is sufficiently tight and a clicking sound is heard. The knob can then be allowed to return (e.g. under the biasing force) axially inward to the second, resting position (e.g. with any small rotation being performed if needed to ensure that the teeth of the knob align with, and enter, the apertures of the sidewall of the frame). The user can let go of the adjustment knob and the strap will be maintained in this optimally-tightened condition. If it is desired to loosen the strap, the knob can be manually axially retracted into the first axial position and rotated in a strap-unwinding direction to the extent needed. When this is complete, the knob can be allowed to return to the second, resting position, in which it will remain.

Figure 7:
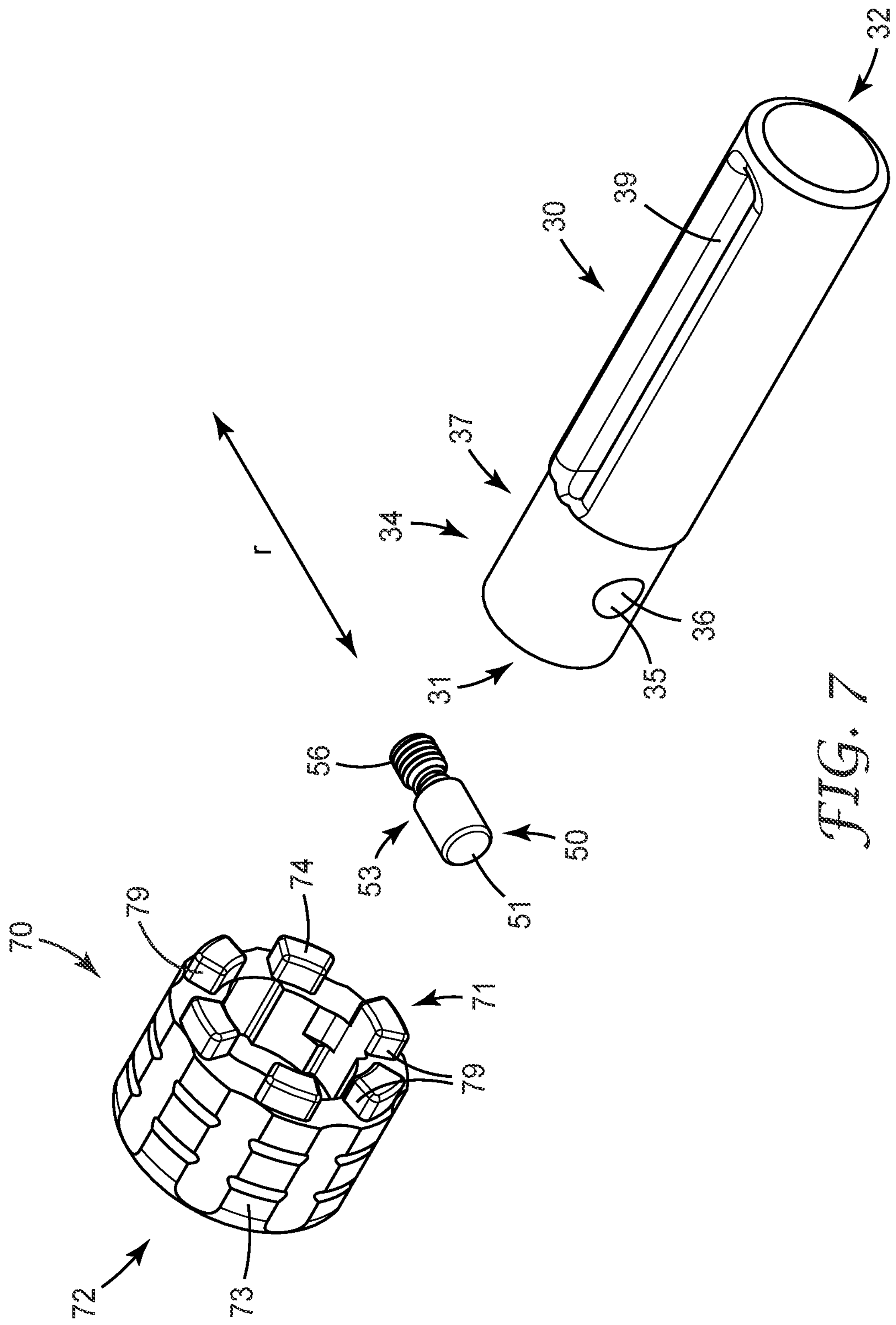
FIG. 7 is an isolated partially exploded view of particular components of an exemplary strap adjuster.
Figure 8:
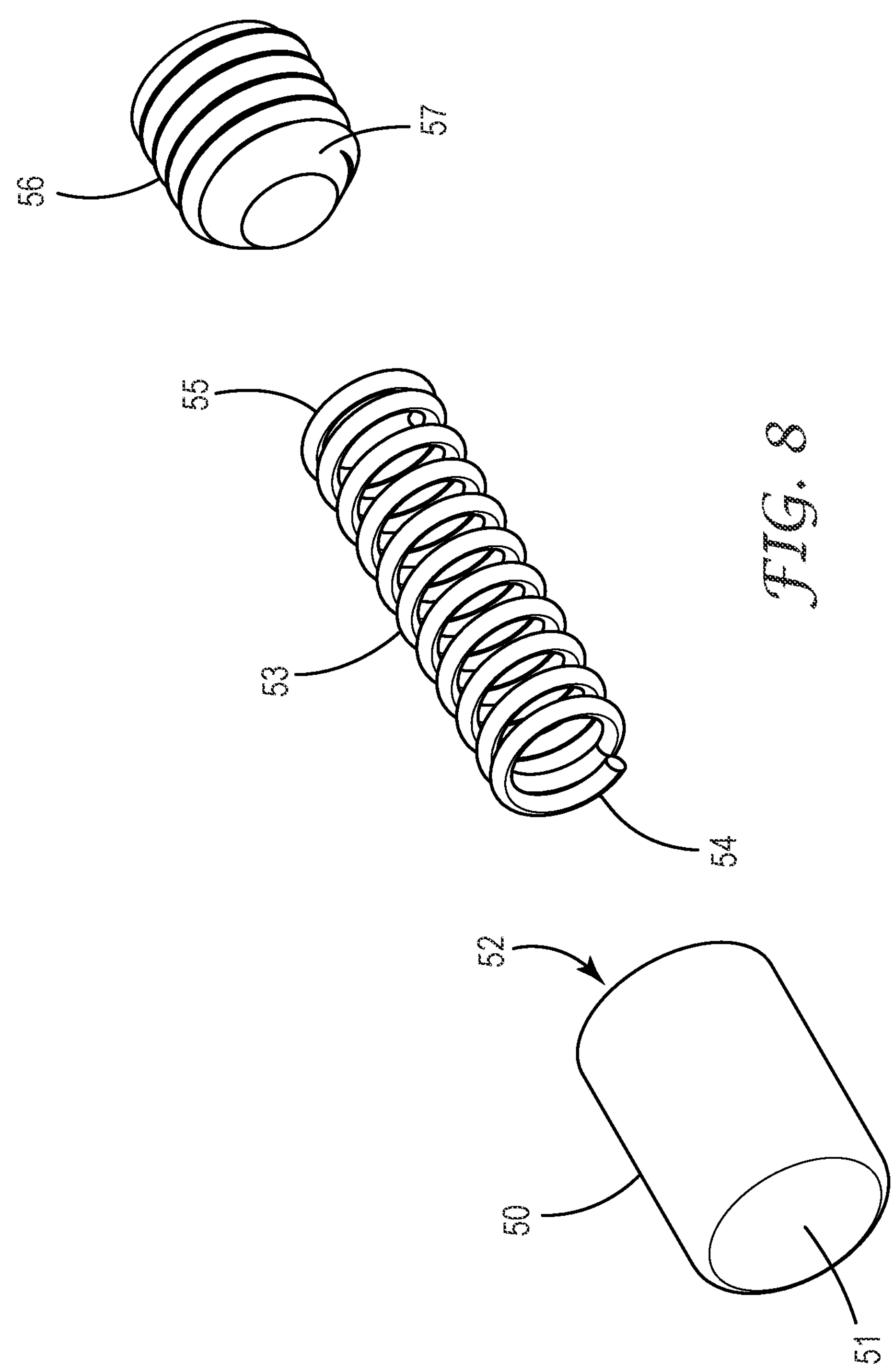
FIG. 8 is an isolated exploded view of an exemplary biased pin usable in a strap adjuster.

The condition that adjustment knob 70 will be unable to rotate when in the second, resting position in which the at least one tooth of the knob is at least partially residing in a complementary aperture of the frame sidewall can be facilitated by way of the at least one tooth 74 of knob 70 having circumferential sidewalls that are at least substantially vertical, meaning that they extend at least substantially in a strictly radially-outward direction. Circumferential sidewalls that are vertical in this manner are exemplified by circumferential sidewalls 79 of teeth 74 as indicated in FIG. 7. (This can be contrasted with teeth that have circumferential sidewalls that are appreciably sloped.) The presence of such tooth sidewalls can ensure that an attempted rotation of knob 70 will not provide any camming action of a tooth sidewall against an aperture wall that might tend to make knob 70 retract axially outward and, in so doing, allow knob 70 to rotate. Also, teeth 74 (and knob 70 as a whole) are durable items with teeth 74 not being configured e.g. to fracture and break under load so as to allow knob 70 to turn upon the application of a sufficiently high force, while in the second, resting position.

However, in some embodiments, the at least one tooth 74 of adjustment knob 70 may comprise a circumferential sidewall that is sloped so as to allow knob 70 to be rotated e.g. in a strap-winding direction even when in a second, resting position. In such a configuration, knob 70, when rotated, will typically be urged axially outward by the camming action of the tooth, will then return axially inward under the biasing force (if a biasing spring is present), will again be urged axially outward by the camming action of the tooth or teeth, and so on, as the knob continues to rotate. In some such embodiments the centrifugally-opposing sidewalls may remain at least substantially vertical (unsloped) so that the knob cannot be rotated in an opposing (e.g. strap-unwinding) direction when in the second, resting position.

Numerous variations of the above-presented arrangements are possible. For example, rather than having an end of a second strap 13 fixed to strap adjuster 20 as described earlier herein, a strap adjuster may have a portion of a buckle fixed to it. Such an arrangement is depicted in exemplary embodiment in FIG. 2, in which strap adjusters 120 of leg straps 15 and 16 each have a buckle portion 121 attached to the strap adjuster, rather than having a fixed strap attached to the strap adjuster. Any such arrangement may be configured as desired. For example, a buckle portion that is attached to a strap adjuster may be a male portion or a female portion, may be attached to the frame of the strap adjuster (e.g. pivotally attached to the frame), may be an integral portion or extension of the strap adjuster frame, and so on. Other variations are possible. For example, any of the biasing springs mentioned herein may take the form of e.g. a coil spring held in expansion, or a leaf spring, a torsion spring, and so on.

In some embodiments a harness (e.g. a fall-protection full-body safety harness) with which one or more strap adjusters will be used may be a so-called H-style harness, e.g. that is donned by wrapping the harness laterally around the user's body (as in donning a jacket or vest) and with the harness including left and right chest/torso straps that respectively extend down left and right portions of the user's chest and torso, with the chest straps being connected by a cross-chest strap of the general type shown as item 7 in FIGS. 1 and 2. In other embodiments a harness may be a so-called crossover-style harness. In such a harness, one chest/torso strap extends from the right shoulder to the left hip, and the other chest/torso strap extends from the left shoulder to the right hip, with the chest/torso straps crossing each other, e.g., in the vicinity of the user's breastbone. Typically, a cross-over style harness cannot be donned in lateral wrap-around manner like an H-style harness. Rather, a cross-over harness must be pulled downward over the user's head in the general manner of a pullover sweater. In some embodiments, a strap adjuster as disclosed herein may be used with a hybrid style of harness, e.g. a harness as described in U.S. Provisional Patent Application 63/070,589 and in the resulting PCT application WO 2022/043797; a harness as described in U.S. Provisional Patent Application 63/070,628 and in the resulting PCT application WO 2022/043818; or a harness as described in U.S. Provisional Patent Application 63/211,076, all of which are incorporated by reference in their entirety herein.

In embodiments in which one or more herein-disclosed strap adjusters are used with a fall-protection full-body safety harness, such a harness may be used with any suitable fall protection apparatus or system. Such apparatus or systems include, but are not limited to, so-called self-retracting lifelines (SRLs, whether e.g. overhead-mounted, horizontally-mounted, or so-called personal SRLs comprising a housing that is attached to the user's harness), positioning lanyards, and so on. In some embodiments, such a fall-protection full-body harness may meet the requirements of ANSI Z359.12. Fall-protection harnesses with which one or more herein-described strap adjusters may be used, and fall-protection apparatus and systems with which a harness that is equipped with one or more herein-described strap adjusters may be used, are described in detail e.g. in the 3M DBI-SALA Fall Protection Full Line Catalog 2021/2022.

Although discussions herein have focused on the use of the herein-disclosed strap adjusters with harnesses that are fall-protection full-body safety harnesses, the disclosed strap adjusters may find use with any type of harness, e.g. an SCBA harness, a climbing harness, a general purpose harness, and so on. Some such harnesses may not be subject to the specific regulatory requirements that are applicable to fall-protection full-body safety harnesses. This being the case, a strap adjuster that is used for such a harness may not necessarily need one or more of the features, properties or attributes disclosed herein. For example, an adjustment knob of a strap adjuster for a general purpose harness may be able to be made of molded plastic rather than metal.

It will be apparent to those skilled in the art that the specific exemplary elements, structures, features, details, configurations, etc., that are disclosed herein can be modified and/or combined in numerous embodiments. All such variations and combinations are contemplated by the inventor as being within the bounds of the conceived invention, not merely those representative designs that were chosen to serve as exemplary illustrations. Thus, the scope of the present invention should not be limited to the specific illustrative structures described herein, but rather extends at least to the structures described by the language of the claims, and the equivalents of those structures. Any of the elements that are positively recited in this specification as alternatives may be explicitly included in the claims or excluded from the claims, in any combination as desired. Any of the elements or combinations of elements that are recited in this specification in open-ended language (e.g., comprise and derivatives thereof), are considered to additionally be recited in closed-ended language (e.g., consist and derivatives thereof) and in partially closed-ended language (e.g., consist essentially, and derivatives thereof). Although various theories and possible mechanisms may have been discussed herein, in no event should such discussions serve to limit the claimable subject matter. To the extent that there is any conflict or discrepancy between this specification as written and the disclosure in any document that is incorporated by reference herein but to which no priority is claimed, this specification as written will control. This application claims priority to U.S. Provisional Patent Application No. 63/341,124, filed 12 May 2022, the disclosure of which is incorporated by reference in its entirety herein.

What is claimed is:

1. A strap adjuster comprising:

a frame with first and second sidewalls, a shaft rotatably seated in first and second shaft-seating openings of the first and second sidewalls, the shaft having a long axis that defines an axial direction of the shaft, frame, and strap adjuster, and the shaft being configured to allow an end section of a first strap to be attached thereto, an adjustment knob disposed on a first end section of the shaft so that at least a majority of the first end section of the shaft resides in a cavity defined in part by a radially-inward surface of the adjustment knob, and, a pin mounted in a radial bore located in the first end section of the shaft, the pin being positioned so that a head of the pin is located proximate a first, open end of the radial bore and the pin being biased so that the head of the pin is urged radially outward from the first, open end of the radial bore, wherein a first portion of the radially-inward surface of the adjustment knob defines a first interior annular collar that is configured to accept the head of the biased pin thereinto, the first interior annular collar comprising at least one first circumferentially-oriented notch defined on one circumferential end by a circumferential wall and defined on a second, opposing circumferential end by a circumferential ramp.

2. The strap adjuster of claim 1 wherein a second portion of the radially-inward surface of the adjustment knob defines a second interior annular collar that is configured to accept the head of the biased pin thereinto, the second interior annular collar comprising at least one second circumferentially-oriented notch defined on one end by a circumferential wall and defined on a second, opposing circumferential end by a circumferential wall.

3. The strap adjuster of claim 2 wherein the second interior annular collar is positioned axially outward from the first interior annular collar, wherein the at least one second circumferentially-oriented notch of the second interior annular collar is circumferentially aligned with the at least one first circumferentially-oriented notch of the first interior annular collar, and wherein the adjustment knob is reversibly movable along the axial direction between a first, axially outwardly retracted position in which the head of the biased pin is axially aligned with, and resides within, the at least one first circumferentially-oriented notch of the first interior annular collar, and a second, resting position in which the head of the biased pin is axially aligned with, and resides within, the at least one second circumferentially-oriented notch of the second interior annular collar.

4. The strap adjuster of claim 3 wherein the adjustment knob is biased axially inward into the second, resting position and is manually axially outwardly retractable away from the second, resting position and into the first, axially-retracted position.

5. The strap adjuster of claim 4 wherein the strap adjuster comprises a retaining plate that is mounted on an end flange attached to a first end of the shaft, and wherein the adjustment knob is biased by a coil spring having a first end abutted against the retaining plate and a second, opposing end abutted against an interior shoulder of the adjustment knob.

6. The strap adjuster of claim 4 wherein with the adjustment knob manually axially outwardly retracted into the first, axially outwardly retracted position, the adjustment knob can be rotated in a strap-winding direction that causes the circumferential ramp of the at least one first circumferentially-oriented notch of the first interior annular collar of the adjustment knob to impinge on the head of the biased pin so as to urge the shaft to co-rotate with the adjustable knob in the strap-winding direction.

7. The strap adjuster of claim 6 wherein the biased pin is biased with a preselected biasing force chosen so that if, when the adjustment knob is rotated in the strap-winding direction, the ramp impinges on the head of the biased pin with a force that is higher than a predetermined value, the head of the biased pin will be urged radially inward into the first, open end of the radial bore of the shaft so that the shaft no longer co-rotates with the adjustable knob.

8. The strap adjuster of claim 4 wherein with the adjustment knob manually axially outwardly retracted into the first, axially-retracted position, the adjustment knob can be rotated in a second, strap-unwinding direction that causes the circumferential wall of the at least one first circumferentially-oriented notch of the first interior annular collar of the adjustment knob to impinge on the head of the biased pin so as to urge the shaft to co-rotate with the adjustable knob in the strap-unwinding direction.

9. The strap adjuster of claim 4 wherein the biased pin comprises an open-ended, radially-inward-facing cavity and wherein the biased pin is biased by way of a coil spring that is seated at least partially within the cavity of the biased pin with the coil spring having a first end that abuts against an interior surface of the biased pin and having an opposing, second end that abuts against a spring-support surface of the shaft.

10. The strap adjuster of claim 9 wherein the spring-support surface of the shaft is a fixed surface at a second, opposing end of the radial bore of the shaft so that a biasing force provided by the biasing spring is not adjustable; or, is a movable surface provided by a set screw that is adjustably mounted in the second, opposing end of the radial bore of the shaft so that the biasing force exerted by the biasing spring is adjustable.

11. The strap adjuster of claim 4 wherein the adjustment knob comprises at least one axially-inwardly facing tooth that is configured to fit at least partially within a complementary aperture of the first sidewall of the frame when the adjustment knob is in the second, resting position so that when the adjustment knob is in the second, resting position the adjustment knob cannot be rotated in a strap-winding direction or in a strap-unwinding direction; and, wherein when the adjustment knob is in the second, resting position, the head of the biased pin is axially aligned with, and resides within, the at least one second circumferentially-oriented notch of the second annular collar so that the shaft is substantially prevented from rotating relative to the adjustment knob.

12. The strap adjuster of claim 11 wherein the adjustment knob comprises at least four circumferentially-spaced, axially-inwardly facing teeth and wherein the first sidewall of the frame comprises at least four complementary circumferentially-spaced apertures so that when the adjustment knob is in the second, resting position the at least four teeth of the adjustment knob reside at least partially within the at least four complementary apertures so that when the adjustment knob is in the second, resting position the adjustment knob cannot be rotated in the strap-winding direction or in the strap-unwinding direction.

13. The strap adjuster of claim 1 wherein the first interior annular collar comprises two, three, or four first circumferentially-oriented notches each defined on a circumferential end by a circumferential wall and defined on an opposing circumferential end by a circumferential ramp, and, wherein the second interior annular collar comprises two, three, or four second circumferentially-oriented notches each defined on a circumferential end by a circumferential wall and defined on an opposing circumferential end by a circumferential wall, and further wherein each of the second circumferentially-oriented notches is circumferentially aligned with a first circumferentially-oriented notch.

14. A strap assembly comprising the strap adjuster of claim 1 along with the first strap, with an end section of the first strap being non-detachably attached to the shaft of the strap assembly so that an elongate portion of the first strap can be wound onto the shaft by rotating the adjustment knob in a strap-winding direction and can be unwound from the shaft by rotating the adjustment knob in a strap-unwinding direction.

15. The strap assembly of claim 14 further comprising a second strap, with an end section of the second strap being non-detachably attached to a crossbar of the frame of the strap assembly.

16. The strap assembly of claim 14 wherein a buckle portion is non-detachably attached to the frame of the strap assembly.

17. A fall-protection full-body safety harness comprising the strap adjuster of claim 1 installed on the first strap of the safety harness, the safety harness comprising first and second shoulder straps that overlap and cross at a dorsal crossing point; first and second chest straps that are respectively continuations of the first and second shoulder straps; and, first and second leg straps, the fall-protection full-body safety harness being configured to be used with a fall-protection apparatus to arrest a fall of a user wearing the fall-protection full-body safety harness.

18. The fall-protection full body safety harness of claim 17 wherein the first strap of the safety harness on which the strap adjuster is installed, is the first chest strap of the safety harness.

19. The strap adjuster of claim 1 wherein the frame of the strap adjuster is made of metal.

20. The strap adjuster of claim 19 wherein the frame of the strap adjuster is made of steel.

* * * * *